US011575500B2

(12) United States Patent
Gomez et al.

(10) Patent No.: US 11,575,500 B2
(45) Date of Patent: Feb. 7, 2023

(54) ENCRYPTED PROTECTION SYSTEM FOR A TRAINED NEURAL NETWORK

(71) Applicant: SAP SE, Walldorf (DE)

(72) Inventors: Laurent Y. Gomez, Le Cannet (FR); Jose Marquez, NuBloch (DE); Patrick Duverger, Antibes (FR)

(73) Assignee: SAP SE, Walldorf (DE)

( * ) Notice: Subject to any disclaimer, the term of this patent is extended or adjusted under 35 U.S.C. 154(b) by 1199 days.

(21) Appl. No.: 16/045,113

(22) Filed: Jul. 25, 2018

(65) Prior Publication Data
US 2020/0036510 A1    Jan. 30, 2020

(51) Int. Cl.
*H04L 9/00* (2022.01)
*G06N 3/04* (2006.01)
*G06N 3/08* (2006.01)
*H04L 9/08* (2006.01)

(52) U.S. Cl.
CPC .......... *H04L 9/008* (2013.01); *G06N 3/0481* (2013.01); *G06N 3/08* (2013.01); *H04L 9/0825* (2013.01)

(58) Field of Classification Search
CPC ..... H04L 9/008; H04L 9/0825; G06N 3/0481; G06N 3/08
USPC .......................................................... 726/15
See application file for complete search history.

(56) References Cited

U.S. PATENT DOCUMENTS

| | | | |
|---|---|---|---|
| 10,719,613 B1 * | 7/2020 | Rotem | G06N 3/0454 |
| 2016/0155048 A1 * | 6/2016 | McCormick | G06N 3/04 |
| | | | 706/27 |
| 2019/0065974 A1 * | 2/2019 | Michigami | G06N 3/084 |
| 2019/0114538 A1 * | 4/2019 | Ng | G06N 3/063 |
| 2019/0392305 A1 * | 12/2019 | Gu | G06N 3/063 |

(Continued)

FOREIGN PATENT DOCUMENTS

WO    WO-2016118206 A2 *   7/2016   ........... G06N 3/0481

OTHER PUBLICATIONS

Herve Chabanne etal, Privacy-Preserving Classification on Deep Neural Network, 2017, Real World Cryptography 2017 (Year: 2017).*

(Continued)

*Primary Examiner* — Mohammad W Reza
*Assistant Examiner* — Moeen Khan
(74) *Attorney, Agent, or Firm* — Schwegman Lundberg & Woessner, P.A.

(57) ABSTRACT

Systems and methods are provided for receiving input data to be processed by an encrypted neural network (NN) model, and encrypting the input data using a fully homomorphic encryption (FHE) public key associated with the encrypted NN model to generate encrypted input data. The systems and methods further provided for processing the encrypted input data to generate an encrypted inference output, using the encrypted NN model by, for each layer of a plurality of layers of the encrypted NN model, computing an encrypted weighted sum using encrypted parameters and a previous encrypted layer, the encrypted parameters comprising at least an encrypted weight and an encrypted bias, approximating an activation function for the level into a polynomial, and computing the approximated activation function on the encrypted weighted sum to generate an encrypted layer. The generated encrypted inference output is sent to a server system for decryption.

16 Claims, 15 Drawing Sheets

(56) References Cited

U.S. PATENT DOCUMENTS

2020/0019867 A1* 1/2020 Nandakumar ........ G06F 21/602

OTHER PUBLICATIONS

Augasta, M G, et al., "Reverse Engineering the Neural Networks for Rule Extraction in Classification Problems", Neural Processing Letters 35(2), (2012), 131-150.
Brakerski, Zvika, et al., "Fully homomorphic encryption without bootstrap-ping.", Cryptology ePrint Archive, (2011).
Chabanne, Herve, et al., "Privacy-Preserving Classification on Deep Neural Network", IACR Cryptology ePrint Archive, 35, (2017), 18 pgs.
Clevert, Djork-Arne, et al., "Fast and Accurate Deep Network Learning by Exponential Linear Units (ELUS)", ICLR. arXiv preprint arXiv:1511.07289., (2016), 14 pgs.
Cramer, Ronald, et al., "(Introduction only) Part I: Secure Multi-party Computation, pp. 3-13", Secure Multiparty Computation and Secret Sharing, (2015), 2 pgs.
Dowlin, Nathan, et al., "CryptoNets: Applying Neural Networks to Encrypted Data with High Throughput and Accuracy", Proceedings of the 33 rd International Conference on Machine Learning, vol. 48, 201-210, (Feb. 24, 2016), 12 pgs.
Fan, J, et al., "Somewhat Practical Fully Homomorphic Encryption", In Journal of IACR Cryptology ePrint Archive, (May 7, 2012), 19 pgs.
Floares, Alexandru, "A reverse engineering algorithm for neural networks, applied to the subthalamopallidal network of basal ganglia", Neural Networks 21 (2008), (2008), 379-386.
Gentry, Craig, "A Fully Homomorphic Encryption Scheme (Dissertation )", Stanford University, (Sep. 2009), 209 pgs.
Goodfellow, I, et al., "(Book Overview) Deep Learning, vol. I.", MIT Press, (2016), 2 pgs.
Graepel, Thore, et al., "ML Confidential: Machine Learning on Encrypted Data", ICISC, (Sep. 2012), 15 pgs.
Halevi, Shai, et al. "Algorithms in HElib", Crypto 2014, Part I, LNCS 8616, (2014), 554-571.
He, Kaiming, et al., "Deep Residual Learning for Image Recognition", IEEE Conference on computer vision and pattern recognition, (2016), 770-778.
Hesamifard, Ehsan, et al., "CryptoDLI: Deep Neural Networks over Encrypted Data", CoRR, abs/1711.05189, (2017), 21 pgs.
Ioffe, Sergey, et al., "Batch Normalization: Accelerating Deep Network Training by Reducing Internal Covariate Shift", International conference on ma-chine learning, (2015), 448-456.
Krizhevsky, Alex, et al., "ImageNet classification with deep convolutional neural networks", Advances in neural information processing systems, (2012), 1097-1105.
Laine, Kim, et al., "Simple Encrypted Arithmetic Library (SEAL) (v2.0).", Technical Report, (2016), 24 pgs.
Lecun, Y, et al., "Lenet-5, convolutional neural networks", [Online], Retrieved from the Internet: <URL: http://yann. lecun. com/exdb/lenet, p. 20>, (2015), 3 pgs.
Liu, Jian, et al., "Oblivious Neural Network Predictions via MiniONN Transformations", CCS, (2017), 619-631.
Maas, A, et al., "Recti?er Nonlinearities Improve Neural Network Acoustic Models", Proc. ICML, vol. 30, p. 3, (2013), 6 pgs.
Mohassel, P, et al., "SecureML: A system for scalable privacy-preserving machine learning", IEEE Symposium on Security and Privacy (SP)., (2017), 19-38.
Ren, Jimmy, et al., "On Vectorization of Deep Convolutional Neural Networks for Vision Tasks", AAAI, (2015), 1840-1846.
Shokri, Reza, et al., "Privacy-Preserving Deep Learning", CCS, (2015), 1310-1321.
Simonyan, Karen, et al., "Very Deep Convolutional Networks for Large-Scale image Recognition", ICLR 2015, (2015), 1-14.
Tramer, F, et al., "Stealing Machine Learning Models via Prediction APIs", USENIX Security Symposium, pages, (2016), 601-618.
Uchida, Yusuke, et al., "Embedding Watermarks into Deep Neural Networks", ICMR, pp. 269-277, (Apr. 2017), 10 pgs.

* cited by examiner

ENCRYPTED PROTECTION SYSTEM FOR A TRAINED NEURAL NETWORK

BACKGROUND

Mimicking a human's cortex, Neural Networks (NN) enable computers to learn through training. With the recent progress on graphics processing unit (GPU) based computing capabilities, NN have received major improvements such as Convolutional Layers, Batch Normalization, and Residual Blocks. As part of the Deep Learning (DL) field, Deep Neural Networks (DNN) have revolutionized the creation of software based applications for problems with a non-deterministic solution space (e.g. object detection, facial recognition, autonomous driving, video processing, among others).

But, GPU hardware and labeled data sets come at a cost. In addition, NN training is data, time, and energy-intensive. This makes the outcome of DL training very valuable, including, for example, the topology, the number and type of hidden layers including design characteristics (e.g., defined before training), and the model itself, including the values of all the parameters in the trained network.

Furthermore, with the rise of edge computing and the Internet of Things (IoT), NN are meant to be deployed outside of corporate boundaries, closer to customer business, and in potentially insecure environments. This new paradigm calls for solutions to protect IP of distributed DL inference processing systems, with DNN deployment and execution on decentralized systems. The lack of solutions for IP protection exposes trained NN owners to reverse engineering on their DL models, allowing attackers to steal trained NN models.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to systems, methods, and computer readable medium for a neural network (NN) encryption system. Since most NN architectures are grounded on well-known research, example embodiments described herein address the protection of a trained NN model and related data and processes, such as input data (e.g., data input into the trained NN model) and output inference (e.g., data output by the trained NN model). Example embodiments provide for encryption of a trained neural network that can be deployed on various (potentially insecure) decentralized systems, while preserving the trained NN model and mitigating the risk of reverse engineering. Security of the input data and inference results are also guaranteed using example embodiments.

Different techniques may be used to apply security to NN. Two example techniques include variants of Fully Homomorphic Encryption (FHE) and Secure Multiparty Computation (SMC). While FHE techniques allow encrypted addition and multiplication in a single machine, SMC employs gated circuits to perform arithmetic operations on shared data across several communicating machines. With these techniques at hand, NN protection is pursued for two main phases: training and classification/inference. Some existing solutions address secure training and classification, but these solutions do not address the security of the model itself. One solution addresses IP production of NNs using watermarking to detect infringement, but fails to protect confidentiality on input data, inference, or the NN model.

Example embodiments address the technical challenges of protecting the IP of a trained NN, input data, and output inference, leveraging FHE. In one embodiment, once the NN is trained, the parameters of the trained NN model are encrypted homomorphically. The resulting encrypted NN can be deployed on potentially insecure decentralized systems, while preserving the trained NN model and mitigating risk of reverse engineering. Inference can still be carried out over the homomorphically encrypted DNN, inserting homomorphically encrypted data and producing homomorphically encrypted predictions. Confidentiality of the trained NN, input data and inference results are therefore guaranteed. Moreover, the model can be fine-tuned (e.g., by further training to improve the model) on the decentralized systems. For example, the model can be improved while it is encrypted and the improved model will also be encrypted.

Figure 1:
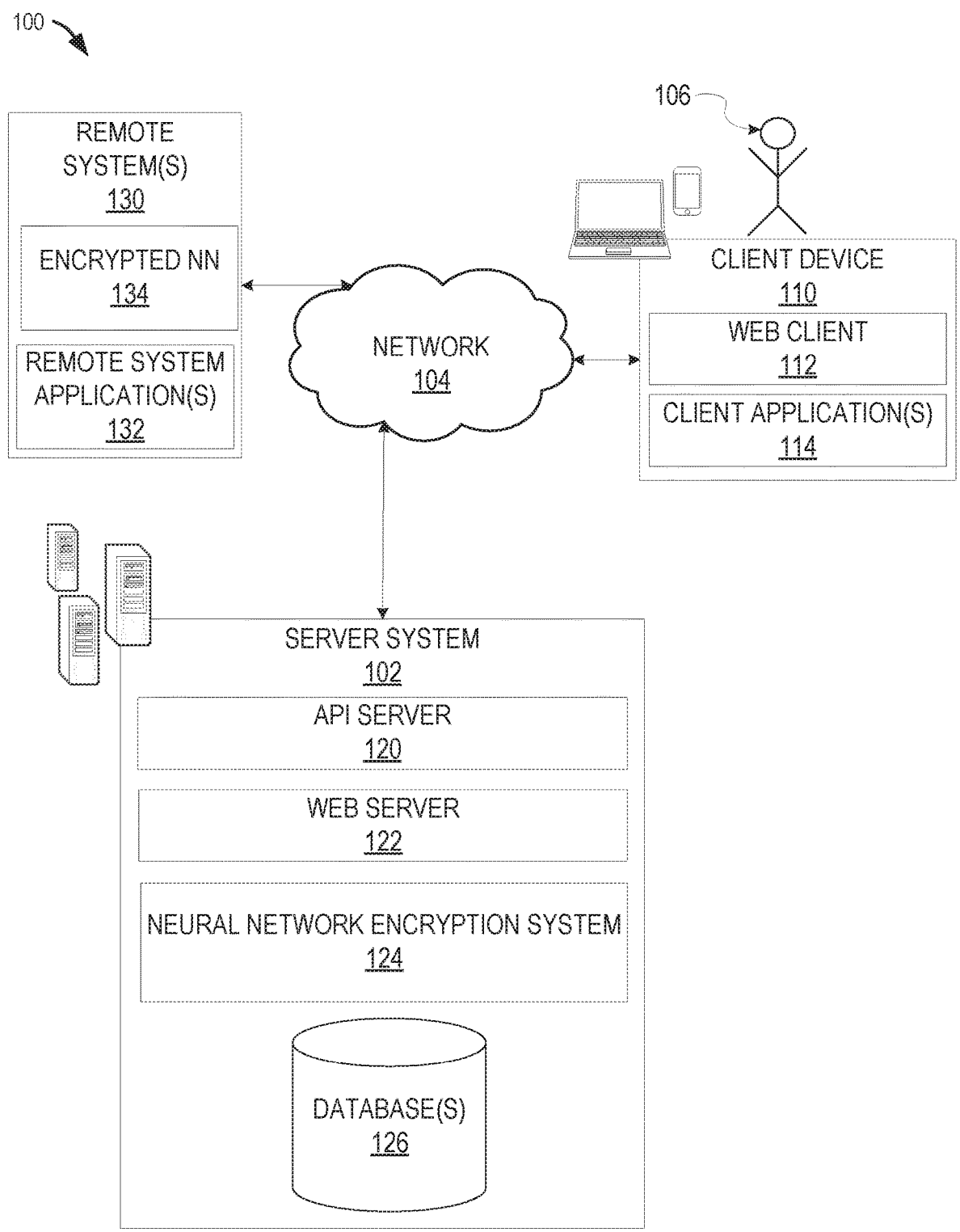
FIG. 1 is a block diagram illustrating a networked system, according to some example embodiments.

FIG. 1 is a block diagram illustrating a networked system 100, according to some example embodiments, configured to encrypt a trained neural network and related data and processes. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, a camera device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to access and utilize cloud services, among other applications.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., remote system(s) 130, server system 102, etc. via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, enterprise resource planning (ERP) application, customer relationship management (CRM) application, an image processing application, an application utilizing an encrypted NN, and the like.

In some embodiments, one or more client applications 114 may be included in a given one of the client device 110, and configured to locally provide the user interface and at least some of the functionalities, with the client application 114 configured to communicate with other entities in the system 100 (e.g., remote systems 130, server system 102, etc.), on an as needed basis, for data and/or processing capabilities not locally available (e.g., access location information, access software version information, access an ERP system, access a CRM system, to authenticate a user 106, to verify a method of payment, for encryption or decryption of a neural network, etc.). Conversely, one or more applications 114 may not be included in the client device 110, and then the client device 110 may use its web browser to access the one or more applications hosted on other entities in the system 100 (e.g., remote systems 130, server system 102, etc.).

A server system 102 may provide server-side functionality via the network 104 (e.g., the Internet or wide area network (WAN)) to one or more remote systems 130 and/or one or more client devices 110. The server system 102 may include an application program interface (API) server 120, a web server 122, and neural network encryption system 124, that may be communicatively coupled with one or more databases 126.

The one or more databases 126 may be storage devices that store data related to users of the system 100, applications associated with the system 100, cloud services, and so forth. The one or more databases 126 may further store information related to remote systems 130, remote system applications 132, client devices 110, client applications 114, users 106, and so forth. In one example, the one or more databases 126 may be cloud-based storage.

The server system 102 may be a cloud computing environment, according to some example embodiments. The server system 102, and any servers associated with the server system 102, may be associated with a cloud-based application, in one example embodiment.

The neural network encryption system 124 may provide back-end support for remote system applications 132 and client applications 114, which may include cloud-based applications. The neural network encryption system 124 may encrypt one or more trained neural networks, manage inference decryption, and the like. The neural network encryption system 124 may comprise one or more servers or other computing devices or systems.

The system 100 may further include one or more remote systems 130. The one or more remote systems 130 may include one or more remote system application(s) 132. The one or more remote system application(s) 132, executing on remote systems 130, may interact with the server system 102 via API server 120 via a programmatic interface provided by the API server 120. For example, one or more the remote system applications 132 may request and utilize information from the server system 102 via the API server 120 to support one or more features or functions on a website hosted by the remote system or an application hosted by the remote system. The remote system website or application 132, for example, may provide functionality that is supported by relevant functionality and data in the server system 102.

In some embodiments, a remote system 130 includes an encrypted neural network (NN) 134. The encrypted NN 134 may include related functionality to encrypt data input into the encrypted NN 134 for processing. For example, the encrypted NN 134 encrypts input data for processing, processes input data using encrypted parameters, and outputs an encrypted inference which is sent to the server system 102 (e.g., neural network encryption system 124) for decryption.

Figure 2:
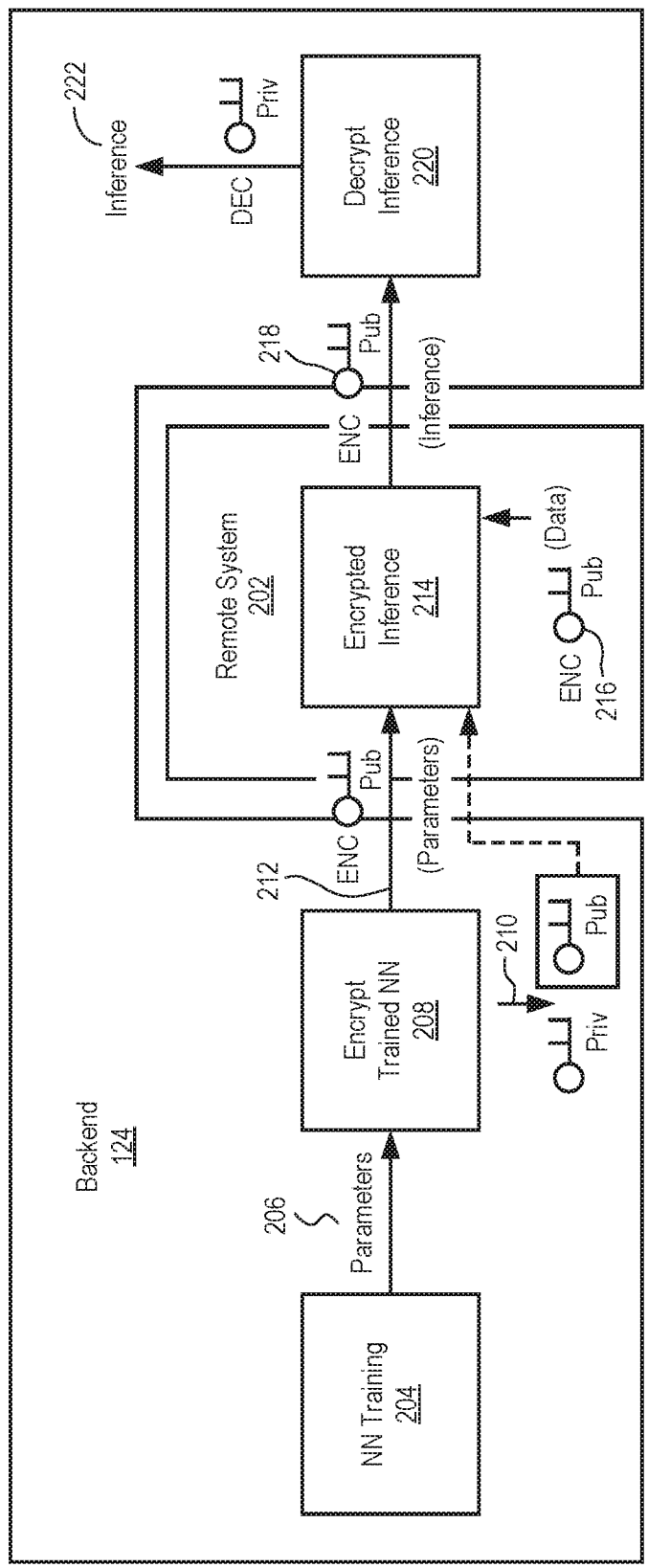
FIG. 2 is a block diagram illustrating a neural network encryption system, according to some example embodiments.

FIG. 2 is a block diagram illustrating a backend system 124 (e.g., neural network encryption system 124) and deployment and interaction with a remote system 202 (e.g., remote system 130 or other system). In this example, the neural network encryption system 124 is structured in four blocks:

1. NN Training 204: during this phase, unencrypted data is used to train the NN. Alternatively, a NN that has already been trained may be imported. The output of a trained NN are parameters, such as a list of weights and biases.
2. Encryption of trained NN 208: once trained, the NN is protected, encrypting all parameters 206 comprised in the model. For example, the weights and biases of the model are encrypted and a key pair public key and private key) is generated 210 (e.g., using homomorphic encryption). The terms neural network, neural network model, and model are used interchangeably herein.

3. Encrypted Inference 214 on decentralized systems: the encrypted NN can be deployed on decentralized systems (e.g., remote system 202) for DL inference, protecting its IP. The public key is sent together with the encrypted NN to the remote system 202. The backend neural network encryption system 124 keeps and stores the private key.

4. Inference decryption 220: the encrypted NN produces encrypted inference 218, to be decrypted by the owner of the trained NN using the private key. The data input to the encrypted NN is also encrypted at 216. The decrypted inference 222 is used by the neural network encryption system 124 or other backend system (e.g., another system in server system 102) to provide related services, analysis, and so forth, to the remote system 202 or other systems.

One example use case scenario may be a video surveillance system for risk prevention in public spaces. For example, a city may be equipped with a video surveillance where a video stream is manually monitored and analyzed by police officers. Manual monitoring is time-consuming, costly and has questionable efficiency. Thus, cameras end up being used posteriori to review an incident. However, smart cities rely on a video-protection infrastructure to improve security and for early detection of incidents in public spaces (e.g., early detection of terrorist attacks, abnormal crowd movement). By empowering cameras with deep learning capabilities on the edge, cameras evolve into multi-function sensors. Pushing the computation to where the data is being obtained substantially reduces communication overhead. This way, cameras can provide analytics and feedback, shifting towards a smart city cockpit.

With such an approach, video management shifts from sole protection to versatile monitoring. These cameras have a simple, but essential, security role. Data from the cameras can also measure in real time the pulse of the agglomeration throughout vehicle flows and people who use them to redefine mobility, reduce public lighting costs, smooth traffic flow, and so forth, Example embodiments provide for IP protection of the neural network deployed on the camera and related data and processes. It is to be understood that this is just one use case scenario for which the encrypted neural network system may be employed.

As explained above, homomorphic encryption is used on some example embodiments. While preserving data privacy, Homomorphic Encryption (HE) schemes allow certain computations on encrypted data without revealing its inputs or its internal states. A Fully Homomorphic Encryption (FHE) scheme was initially introduced which theoretically could compute any kind of function, but it was computationally intractable. FHE then evolved into more efficient techniques like Somewhat/Leveled Homomorphic Encryption (SHE/LHE), which preserves both addition and multiplication over encrypted data. Similar to asymmetric encryption, during KeyGen a public key (pub) is generated for encryption, and a private key (prix), for decryption. Encrypted operations hold:

$$Enc_{pub}(a*b+b) \equiv \langle a*x+b\rangle_{pub} = \langle a*x\rangle_{pub} + \langle b\rangle_{pub} = \langle a\rangle_{pub} * \langle x\rangle_{pub} + \langle b\rangle_{pub} \quad (1)$$

Example embodiments use this formula to encrypt the parameters (e.g., weight, biases, other parameters) of a trained NN.

Modern implementations such as HELib or SEAL include Single Instruction Multiple Data (SIMD), allowing multiple data to be stored in a single ciphertext and vectorizing operations. Hence, FHE protection implies vectorized additions and multiplications.

The data encryption mechanism depends on the chosen scheme. In one example, the most efficient schemes are BGV and FV, which may be used in example embodiments.

$$X \xrightarrow{encryption} ENC_{pub}(X) = \langle X\rangle pub \quad (2)$$

Multiple architectures of deep neural networks have been designed addressing various domains. Example embodiments described herein for IP protection are agnostic about the architecture of the Neural Network or Deep Neural Network. For example purposes, a Deep Convolutional Neural Networks (DCNN), appropriate for video processing is described herein. It is to be understood, however, that any situation (e.g., text processing, image processing, video process, etc.) and any type of neural network or model may be used in the systems and methods described herein.

A DNN with L layers is composed of:
1. An input layer, the tensor of input data X
2. L−1 hidden layers, mathematical computations transforming X somewhat sequentially.
3. An output layer, the tensor of output data Y. The output of layer i is denoted as a tensor A[i], with A[0]=X, and A[L]=Y. Tensors can have different sizes and even a different number of dimensions. Layers inside a NN can be categorized as:

Linear: they only involve polynomial operations, and can be seamlessly protected using FITE, such as Fully Connected layer (FC), Convolutional layer (Cony), residual blocks, and mean pooling.

Non-linear, they include other operations (max, exp, division), and must be converted into sums and multiplications. Some example of non-linear layers include Activation Functions, Batch Normalization, max pooling, and so forth.

Figure 3:
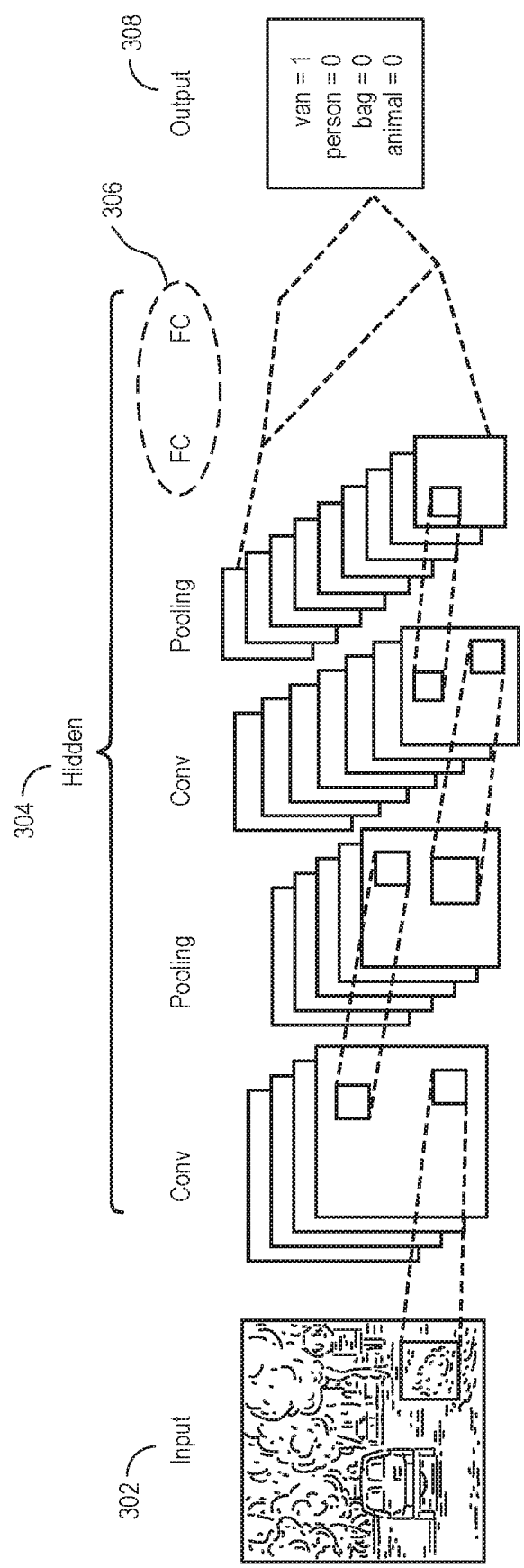
FIG. 3 is a diagram illustrating an example Deep Convolutional Neural Network architecture, according to some example embodiments.

Selecting a DNN architecture involves choosing the number, types, order. and size of the layers. An example of DCNN architecture is shown in FIG. 3: [Conv→Pool]$^n$→[FC]$^m$. The example DCNN architecture in FIG. 3 shows an input layer 302. (e.g., representing the image, text, or other data to be input into the model), a number of hidden layers 304, and an output layer 308 (e.g., representing the output, such as objects recognized in the image).

Generally, DNNs are designed mimicking well known architectures such as LeNet, VG-GNet or ResNet, which are defacto standards for object recognition and image classification. In pursuance of full protection for any given DNN, each layer needs to protect its underlying operations.

Figure 4:
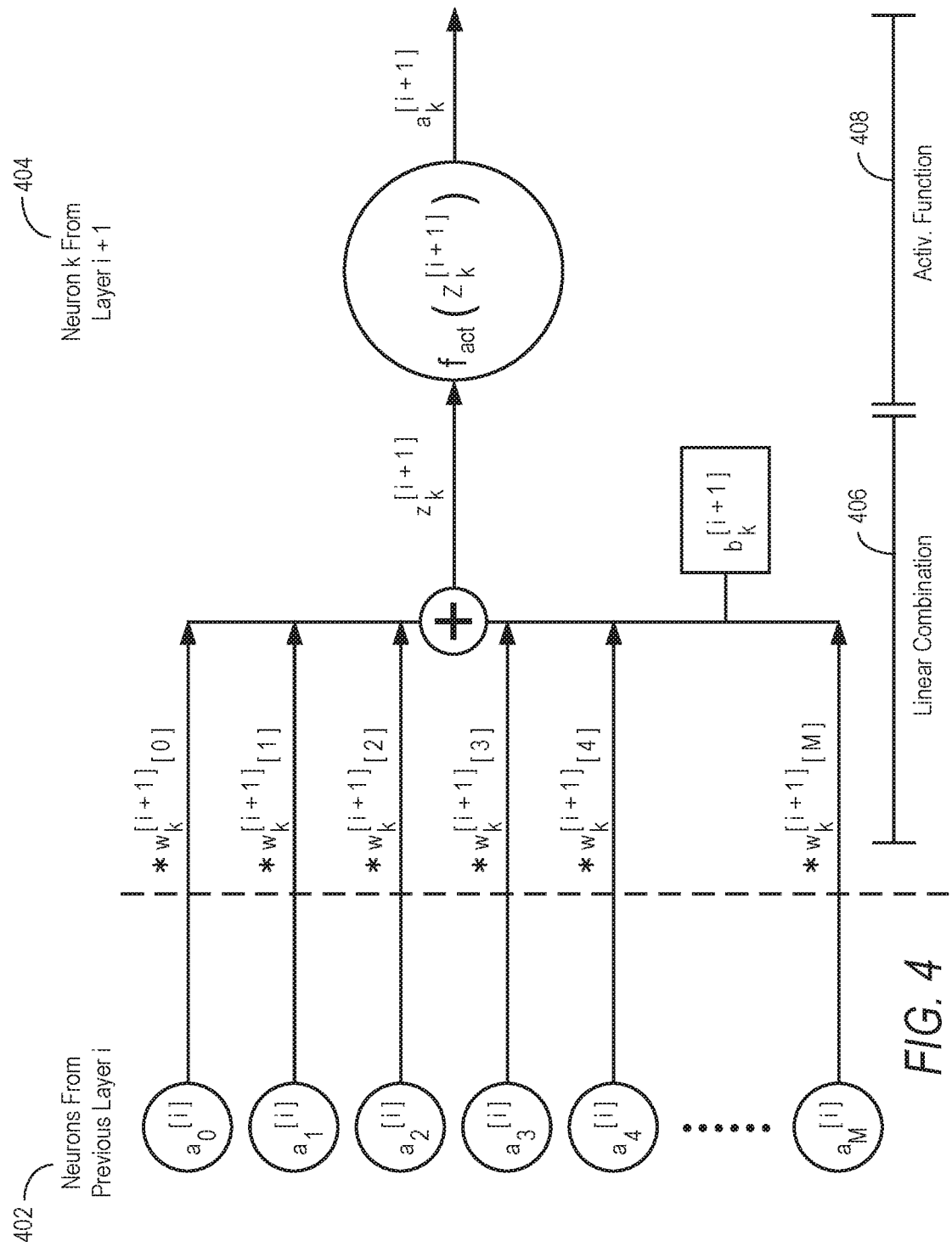
FIG. 4 is a diagram illustrating an example of a fully connected layer with activation for neuron k, according to some example embodiments.

One of the hidden layers shown in the example DCNN architecture in FIG. 3 is a Fully Connected Layer (FC) 306, also known as a Dense Layer. An FC is composed of N parallel neurons, performing an $R^1 \rightarrow R^1$ transformation, as shown in FIG. 4. FIG. 4 shows neurons from previous layer i (402), neuron k from layer i+1 (404), a linear combination 406, and an activation function 408. The following is defined:

$a^{[i]}=[a_0^{[i]} \ldots a_k^{[i]} \ldots a_N^{[i]}]*$ as the output of layer i;
$z^{[i]}=[z_0^{[i]} \ldots z_k^{[i]} \ldots z_N^{[i]}]^T$ as the linear output of layer i; ($z^{[i]}=a^{[i]}$ if there is activation function)
$b^{[i]}=[b_0^{[i]} \ldots b_k^{[i]} \ldots b_N^{[i]}]^T$ as the bias of layer i;
$W^{[i]}=[w_0^{[i]} \ldots w_k^{[i]} \ldots w_N^{[i]}]^T$ weights of layer i.

Neuron k performs a linear combination of the output of the previous layer $a^{[i-1]}$; multiplied by the weight vector $w_k^{[i]}$ and shifted with a bias scalar $b_k^{[i]}$, obtaining the linear combination $z_k^{[i]}$:

$$z_k^{[i]} = \left(\sum_{i=0}^{M} w_k^{[i]}[l] * a_i^{[i-1]}\right) + b_k^{[i]} = w_k^{[i]} * a^{[i-1]} + b_k^{[i]} \quad (3)$$

Vectorizing the operations for all the neurons in layer i we obtain the dense layer transformation:

$$z^{[i]} = W^{[i]} * a^{[i-1]} + b^{[i]} \quad (4)$$

In one example embodiment, to protect the FC layer, since FC is a linear layer, it can be directly computed in the encrypted domain using additions and multiplications. Vectorization is achieved as follows:

$$\langle z^{[i]} \rangle_{pub} \equiv \langle W^{[i]} * a^{[i-1]} + b^{[i]} \rangle_{pub} \quad (5)$$
$$= \langle W^{[i]} \rangle_{pub} * \langle a^{[i-1]} \rangle_{pub} + \langle b^{[i]} \rangle_{pub}$$

Activation functions are the major source of non-linearity in DNNs. They are performed element-wise ($R^O \to R^O$, thus easily vectorized), and generally located after linear transformations (FC, Conv). All activation functions are positive monotonic.

$$a_k^{[i]} = f_{act}(z_k^{[i]}) \quad (6)$$

Rectifier Linear Unit (ReLU) is currently considered as the most efficient activation function for DL. Several variants have been proposed, such as Leaky ReLU, ELU or its differentiable version Softplus.

$$\text{ReLU}(z) = z^+ = \max(0, z) \, \text{Softplus}(z) = \log(e^z + 1) \quad (7)$$

Sigmoid σ is the classical activation function:

$$\text{Sigmoid}(z) = \sigma(z) = \frac{1}{1 + e^{-z}} \quad (8)$$

Hyperbolic Tangent (tanh) is currently being used in the industry because it is easier to train than ReLU: it avoids having any inactive neurons and it keeps the sign of the input.

$$\tanh(z) = \frac{e^z - e^{-z}}{e^z + e^{-z}} \quad (9)$$

In one example embodiment, to protect activation functions, due to their innate non-linearity, the activation functions need to be approximated with polynomials. There are many ways an activation function can be approximated with polynomials. One example is using only σ(z) approximating it with a square function. Another example is using Taylor polynomials around x=0, studying performance based on the polynomial degree. Another example, is approximate instead the derivative of the function and then integrate to obtain their approximation. One alternative would be to use Chebyshev polynomials. Example embodiments can utilize any method to approximate an active function with polynomials.

Figure 5:
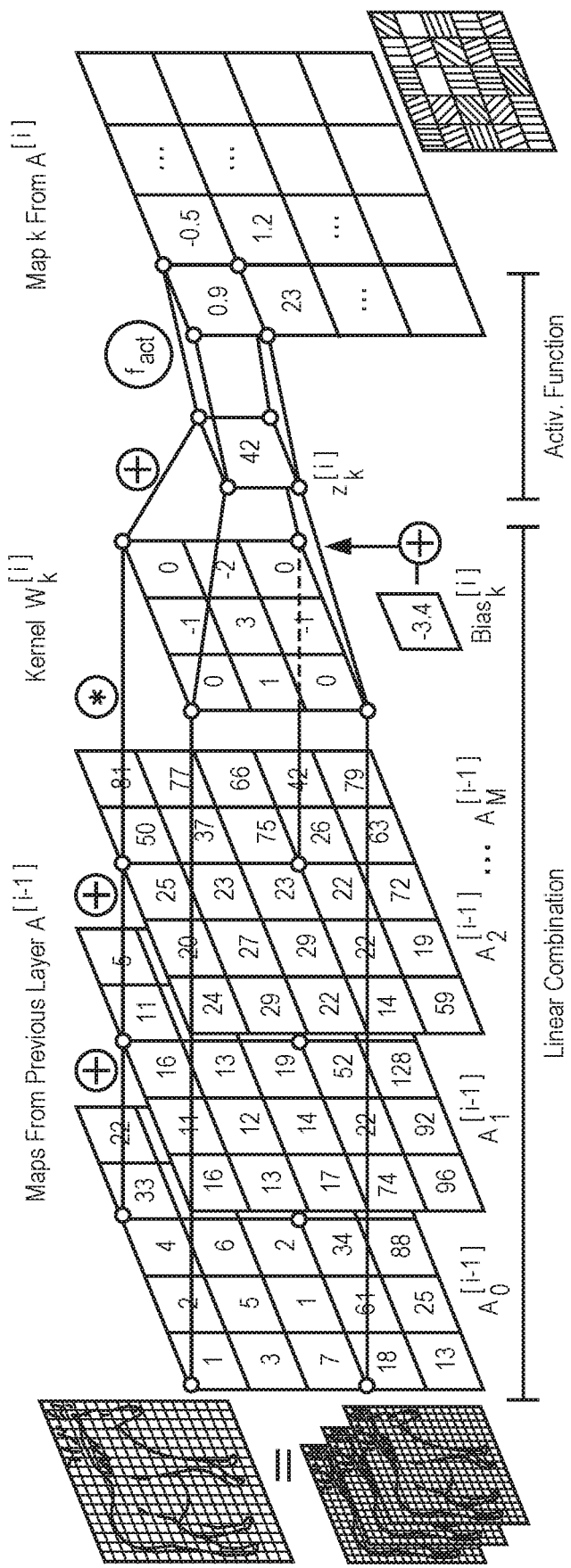
FIG. 5 is a diagram illustrating an example of a convolutional layer with activation for map k, according to some example embodiments.

Convolutional layers (Conv) constitute a key improvement for image recognition and classification using NNs. The $R^{2|3} \to R^{2|3}$ linear transformation involved is spatial convolution, where a 2D s*s filter (a.k.a. kernel) is multiplied to the 2D input image in subsets (patches) with size s*s and in defined steps (strides), then added up and then shifted by a bias, as shown in FIG. 5 illustrating an example cony layer with activation for map k. For input data with several channels or maps (e.g., RGB counts as 3 channels), the filter is applied to the same patch of each map and then added up into a single value of the output image (cumulative sum across maps). A map in Conv layers is the equivalent of a neuron in FC layers. The following is defined:

$A_k^{[i]}$ as the map k of layer i;
$Z_k^{[i]}$ as the linear output of map k of layer i;
($Z_k^{[i]} = A_k^{[i]}$ in absence of activation function)
$b_k^{[i]}$ as the bias value for map k in layer i
$W_k^{[i]}$ as the s*s filter/kernel for map k.

This operation can be vectorized by smartly replicating data. The linear transformation can be expressed as:

$$Z_k^{[i]} = \left(\sum_{m=0}^{M\,maps} A_m^{[i-1]} \oplus W^{[i]}{}_k\right) + b_k^{[i]} \quad (10)$$

In one example embodiment, to protect convolutional layers, convolution operation can be decomposed in a series of vectorized sums and multiplications:

$$\langle Z_k^{[i]} \rangle_{pub} = \left\langle \left(\sum_{m=0}^{M\,maps} A_m^{[i-1]} \oplus W_k^{[i]}\right) + b_k^{[i]} \right\rangle_{pub} = \quad (11)$$

$$\sum_{m=0}^{M\,maps} \langle A_m^{[i-1]} \oplus W_k^{[i]} \rangle_{pub} + \langle b_k^{[i]} \rangle_{pub} =$$

$$\left\{\sum_{m=0}^{M} \langle A_m^{[i-1]}[j] \rangle_{pub} * \langle W^{[i]}{}_k \rangle_{pub}\right\}_{[s*s]} + \langle b_k^{[i]} \rangle_{pub}$$

Figure 6:
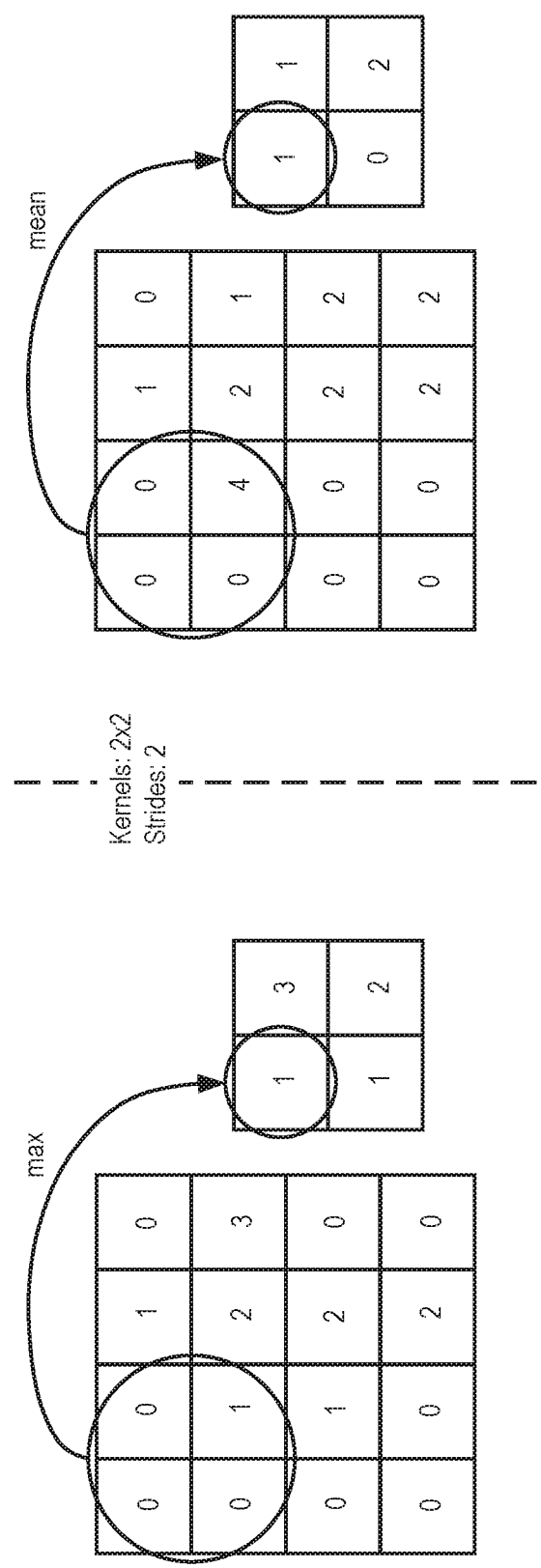
FIG. 6 is a diagram illustrating an example of max and mean packing for pooling layers, according to some example embodiments.

The pooling layer reduces the input size by using a packing function. Most commonly used packing functions are max and mean. Similar to convolutional layers, pooling layers apply their packing function to patches (subsets) of the image with size s*s at strides (steps) of a defined number of pixels, as depicted in FIG. 6.

In one example embodiment, to protect the pooling layer the max can be approximated by the sum of all the values in each patch of size s*s, which is equivalent to scaled mean pooling. Mean pooling can be scaled (sum of values) or standard (multiplying by 1/N). By employing a flattened input, pooling becomes easily vectorized.

Various other techniques include batch normalization, dropout and data augmentation, and residual block. Dropout and data augmentation only affect training procedure, and thus, do not require IP protection.

Batch normalization (BN) reduces the range of input values by "normalizing" across data batches by subtracting mean and dividing by standard deviation. BN also allows finer tuning using trained parameters β and γ (ε is a small constant used for numerical stability).

$$a_k^{[i+1]} = BN_{\gamma,\beta}(a_k^{[i]}) = \gamma * \frac{a_k^{[i]} - E[a_k^{[i]}]}{\sqrt{\text{Var}[a_k^{[i]}] + \varepsilon}} + \beta \quad (12)$$

In one example embodiment, protection of BN is achieved by treating division as the inverse of a multiplication:

$$\langle a_k^{[i+1]} \rangle_{pub} = \quad (13)$$

$$\langle \gamma \rangle_{pub} * (\langle a_k^{[i]} \rangle_{pub} - \langle E[a_k^{[i]}] \rangle_{pub}) * \left\langle \frac{1}{\sqrt{\text{Var}[a_k^{[i]}] + \varepsilon}} \right\rangle_{pub} + \langle \beta \rangle_{pub}$$

Figure 7:
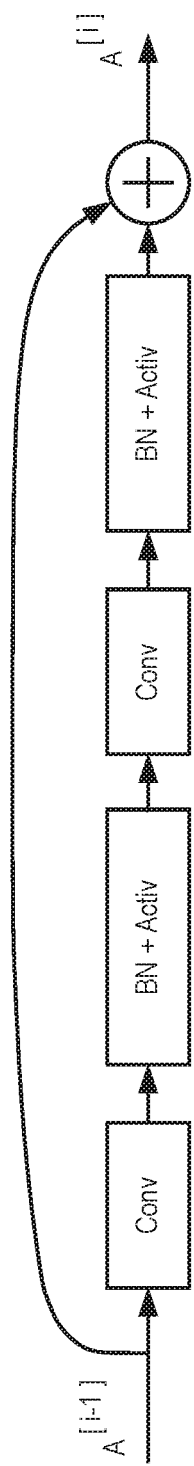
FIG. 7 is a diagram illustrating an example of a possible residual block, according to some example embodiments.

Residual block is an aggregation of layers where the input is added unaltered at the end of the block, thus allowing the layers to learn incremental ("residual") modifications. FIG. 7 illustrates an example of possible residual block.

$$A^{[i]} = A^{[i-1]} + \text{ResBlock}(A^{[i-1]}) \quad (14)$$

In one example embodiment, protection of a residual block is achieved by protecting the sum and layers inside ResBlock:

$$\langle A^{[i]} \rangle_{pub} = \langle A^{[i-1]} \rangle_{pub} + \langle \text{ResBlock}(A^{[i-1]}) \rangle \quad (15)$$

Training a model is data and computationally intensive, and in one example, is performed by means of a backpropagation algorithm to gradually optimize the network loss function. It is also possible to reuse a previously trained model and apply fine tuning. As a result, you get a trained model comprising:

Weights W and biases b in FC and Conv layers,
E[A], $$\frac{1}{\sqrt{\text{Var}[A]}},$$

β and γ parameters in BN.

These parameters (e.g., the weights and biases in the first bullet above, and batch normalization (BN) parameters in the second bullet above) constitute the secrets to be protected when deploying a NN to decentralized systems. In many NN models only weights and biases constitute NN parameters, but NN models may comprise other parameters, such as BN parameters, and so forth. Example embodiments can be employed to protect any parameters of a NN model such that, regardless of the type of targeted NN, all parameters of the NN are encrypted (e.g., homomorphically).

Inference decryption, the decryption of the last layer's output Y, is performed utilizing the private encryption key, as in standard asymmetric encryption schemes:

$$\langle A^{[L]} \rangle_{pub} \xrightarrow{decryption} DEC_{priv}(\langle A^{[L]} \rangle_{pub}) = Y \quad (16)$$

Figure 8:
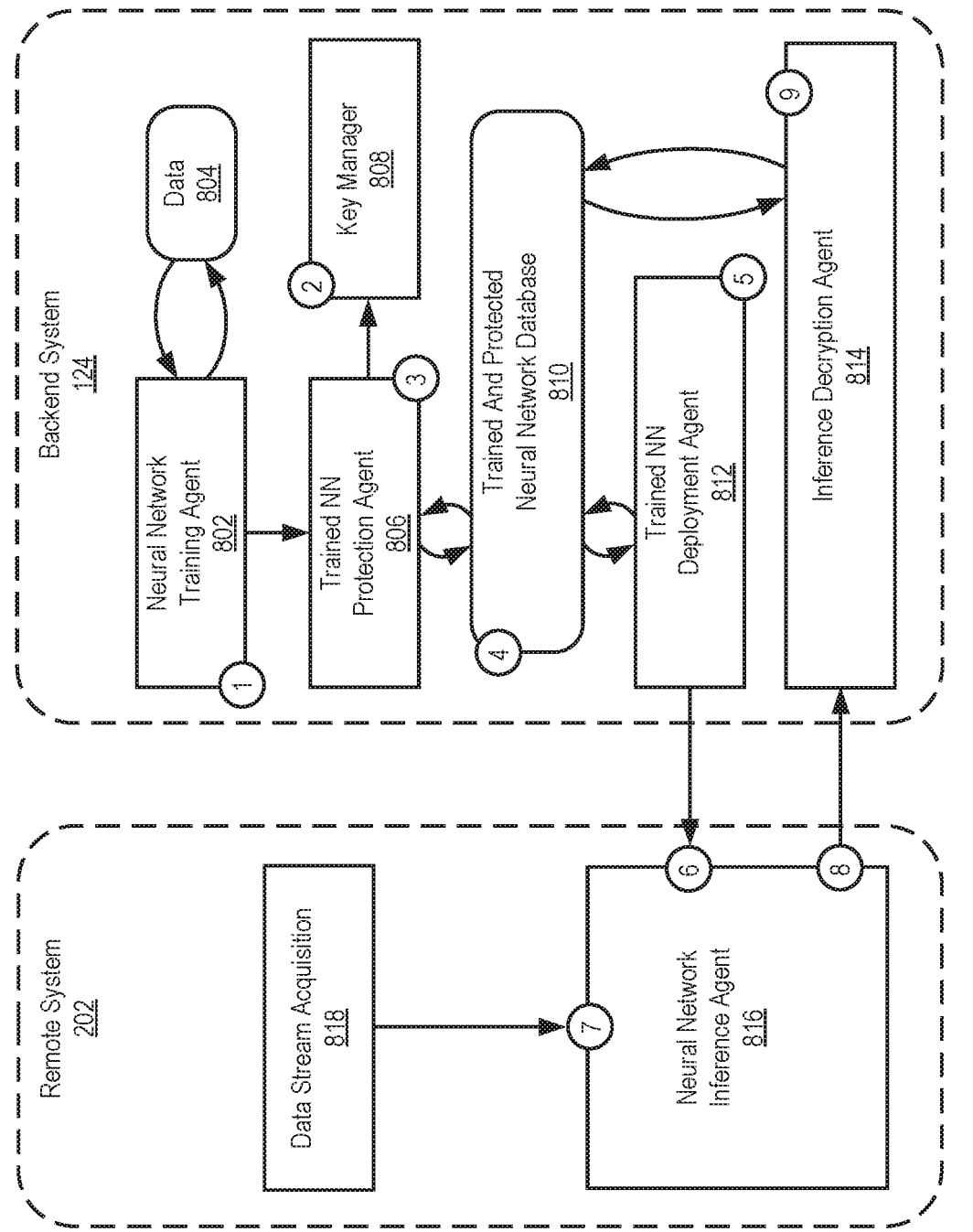
FIG. 8 is an activity diagram illustrating the architecture and information flows of a backend system and a remote system, according to some example embodiments.

FIG. 8 is an activity diagram illustrating the architecture and information flows of a backend system 124 (e.g., neural network encryption system 124) and a remote system 202. In one example embodiment, a neural network training agent 802 uses data 804 to train a neural network. In another example embodiment, an already trained neural network can be imported or accessed by the neural network encryption system 124. The outcome of the training (e.g., NN architecture and parameters) is pushed to the trained NN protection agent. Alternatively, an already trained NN can be imported directly into the protection agent 806.

The trained NN protection agent 806 generates a Fully Homomorphic key pair from the key manager/generator 808. The trained NN is then encrypted and stored together with its homomorphic key part in the trained and protected NN database 810.

At the deployment phase, the trained NN deployment agent 812 deploys the encrypted NN on decentralized systems, such as remote system 202, with the public key. On the remote system 202, data is collected by a data stream acquisition component 818 and forwarded to the NN inference agent 816. Encrypted inferences are sent to the inference decryption agent 814 for decryption using the private key associated with the encrypted NN.

The IP of the trained NN, together with the computed inferences, are protected from any disclosure on the decentralized system throughout the entire process. Next, each sequential process will be described in further detail with reference to FIGS. 9-13.

Figure 9:
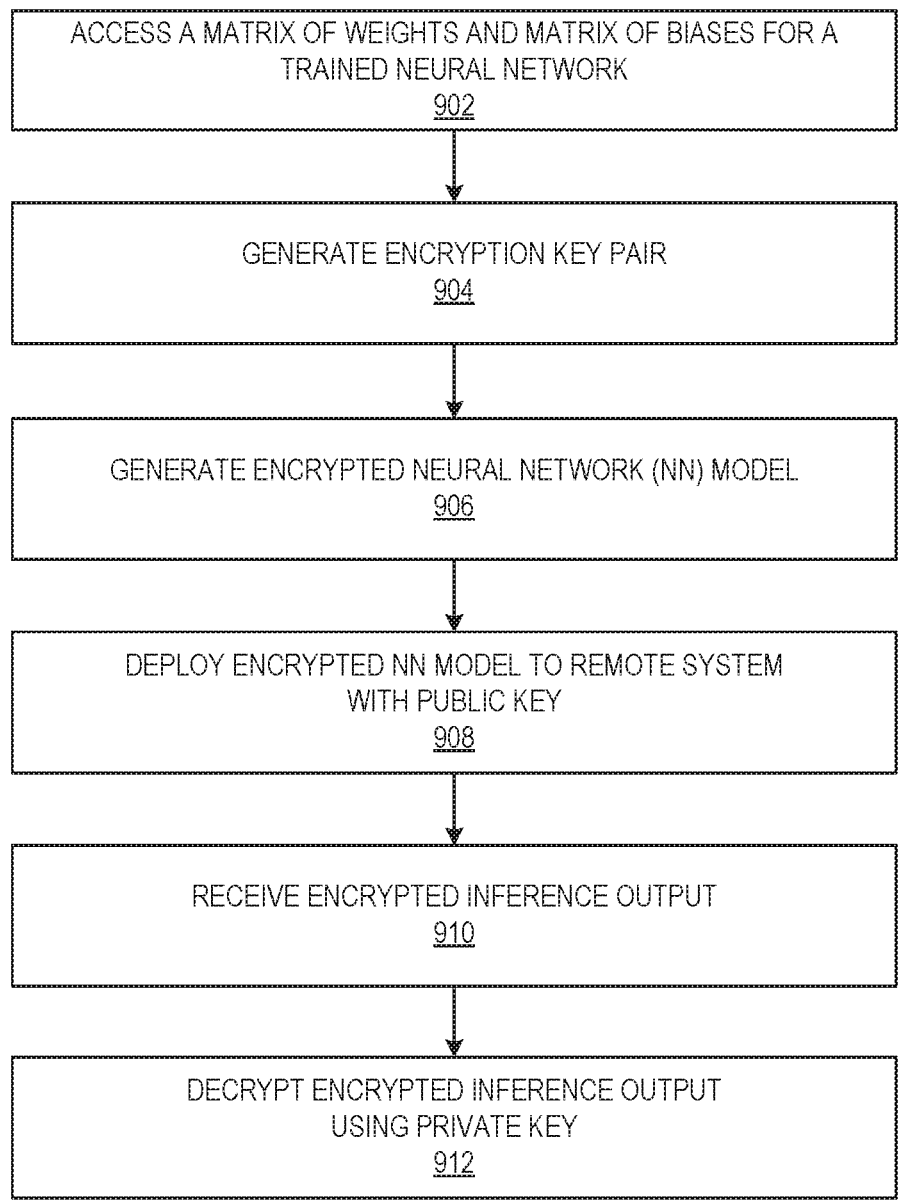
FIG. 9 is flowchart illustrating aspects of a method, according to some example embodiments.
Figure 10:
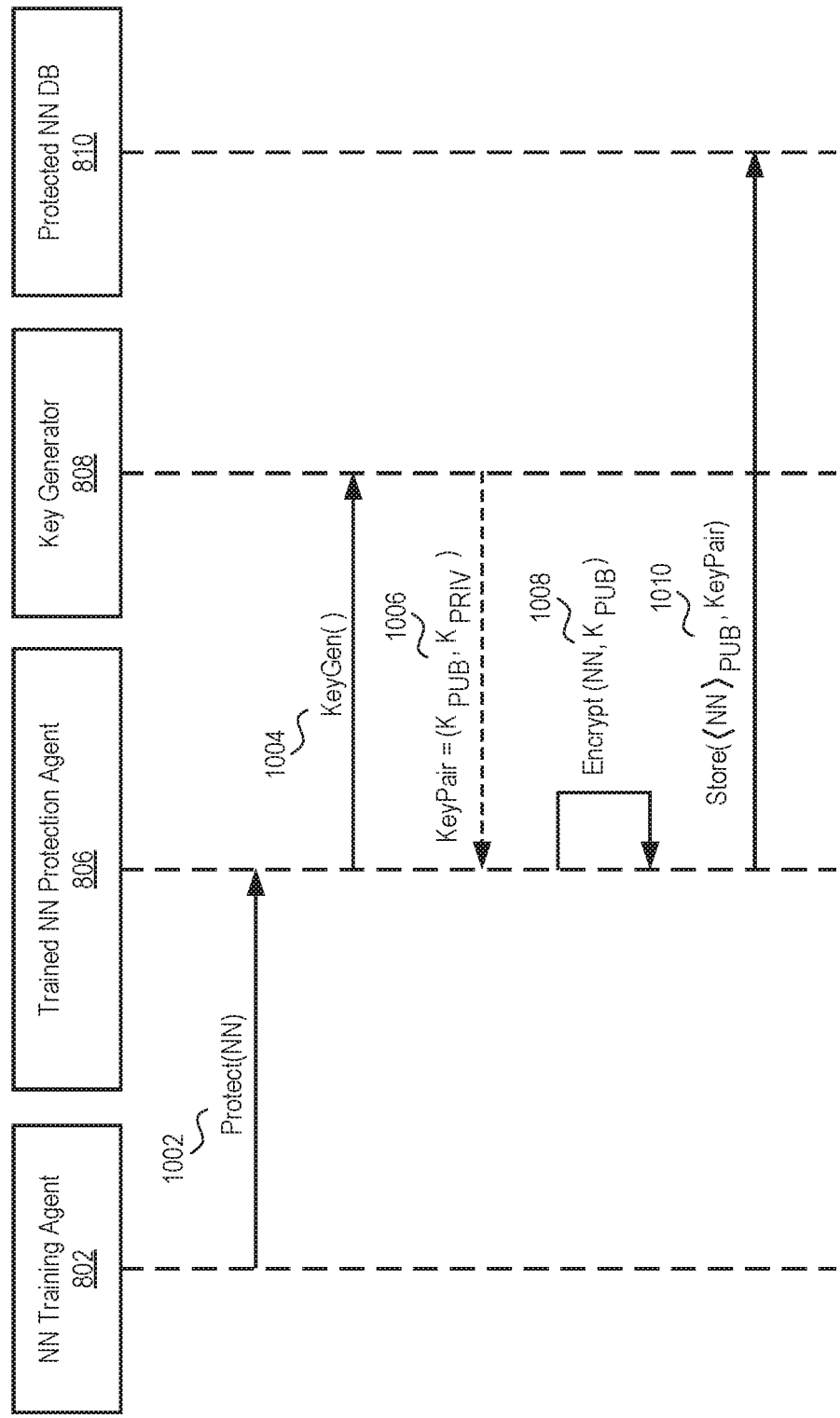
FIG. 10 is an example sequence diagram illustrating encryption of a trained NN, according to some example embodiments.
Figure 11:
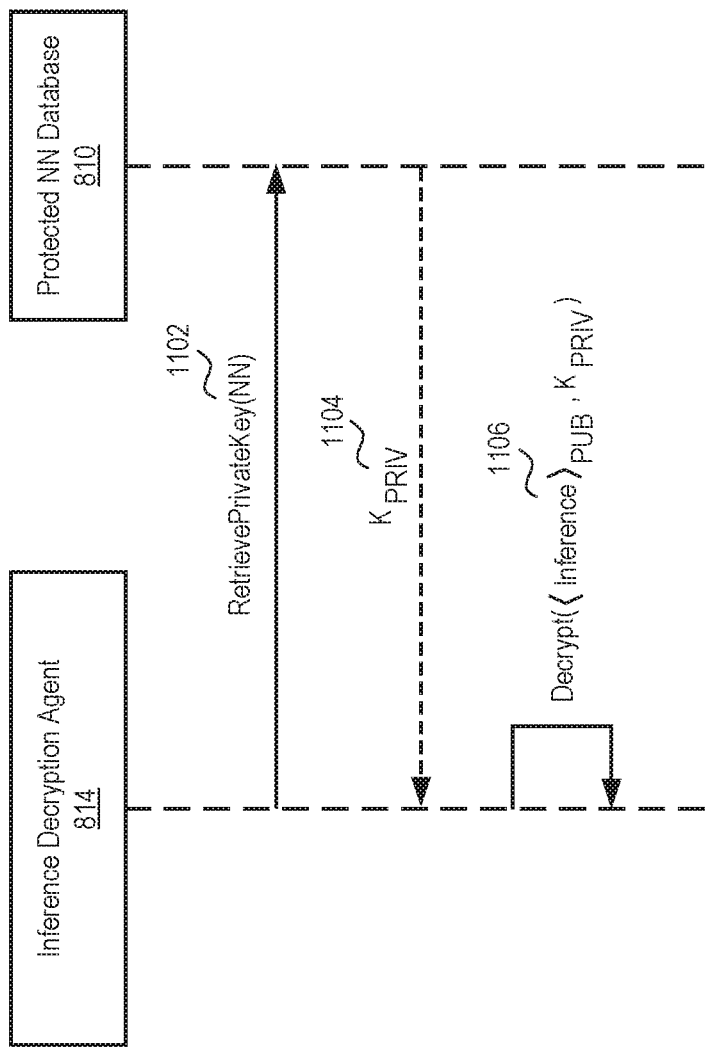
FIG. 11 is an example sequence diagram illustrating inference decryption, according to some example embodiments.

FIG. 9 is a flow chart illustrating aspects of a method 900 for encryption of a trained NN, according to some example embodiments. For example, once a NN is trained or imported, the parameters of the trained. NN are encrypted. For illustrative purposes, method 900 is described with respect to the networked system 100 of FIG. 1 and example sequence diagram in FIG. 10 illustrating encryption of a trained NN, and the example sequence diagram in FIG. 11 illustrating inference decryption. It is to be understood that method 900 may be practiced with other system configurations in other embodiments.

In operation 902, a computing system (e.g., server system 102, neural network encryption system 124) accesses a matrix of weights and a matrix of biases for a trained neural network. For example, as shown in FIG. 10, a NN training agent 802 may train a NN and push the outcome of the trained NN 1002 (e.g., NN architecture and parameters) to the trained NN protection agent 806. In an alternative embodiment, the trained NN protection agent 806 imports or accesses an already trained NN.

In operation 904, the computing system generates a key pair comprising a public key and a private key. For example, as shown in FIG. 10 at 1004, the trained NN protection agent 806 generates (e.g., KeyGen( ) 1004) the key pair 1006 via the key manager/generator 808. In one example embodiment, the key pair is generated using fully homomorphic encryption (FHE), as described above. It is understood that similar encryption techniques may be used in other example embodiments.

In operation 906, the computing system generates an encrypted NN model from the trained NN. For example, the computing system uses the public key to encrypt the NN as shown in 1008 of FIG. 10. In one example, the parameters of the trained NN include a matrix of weights and a matrix of biases. In other examples, other parameters may be included, such as batch normalization and the like. The computing system encrypts each weight in the matrix of weights and each bias in the matrix of biases (and any other parameters) to generate an encrypted NN model for the trained NN, using the public key, as described in further detail above. In one example, the computing system stores the encrypted NN model together with the key pair in one or more databases (e.g., protected NN DB 810) as shown in FIG. 10.

In operation 908, the computing system deploys the encrypted NN model to one or more remote systems with the public key. For example, the trained and protected (e.g., encrypted) NN is deployed on a decentralized system including the network architecture, the network model (e.g., encrypted parameters), and the public encryption key. The one or more remote systems may then use the encrypted NN model for encrypted inference, as described in further detail below.

The computing system receives the encrypted inference (e.g., the encrypted output from the encrypted NN) from a remote system, in operation 910, and decrypts the inference using the private key, in operation 912. In one example, the computing system receives the encrypted inference with an identifier for the NN used for the inference. The computing system uses the identifier to determine which NN and which private key to use to decrypt the encrypted inference. For example, as shown in FIG. 11, the inference decryption agent 814 accesses the protected NN database 810 at 1102 to retrieve the private key at 1104 based on the NN identifier. The inference decryption agent 814 decrypts the encrypted inference at 1106 using the private key.

Figure 12:
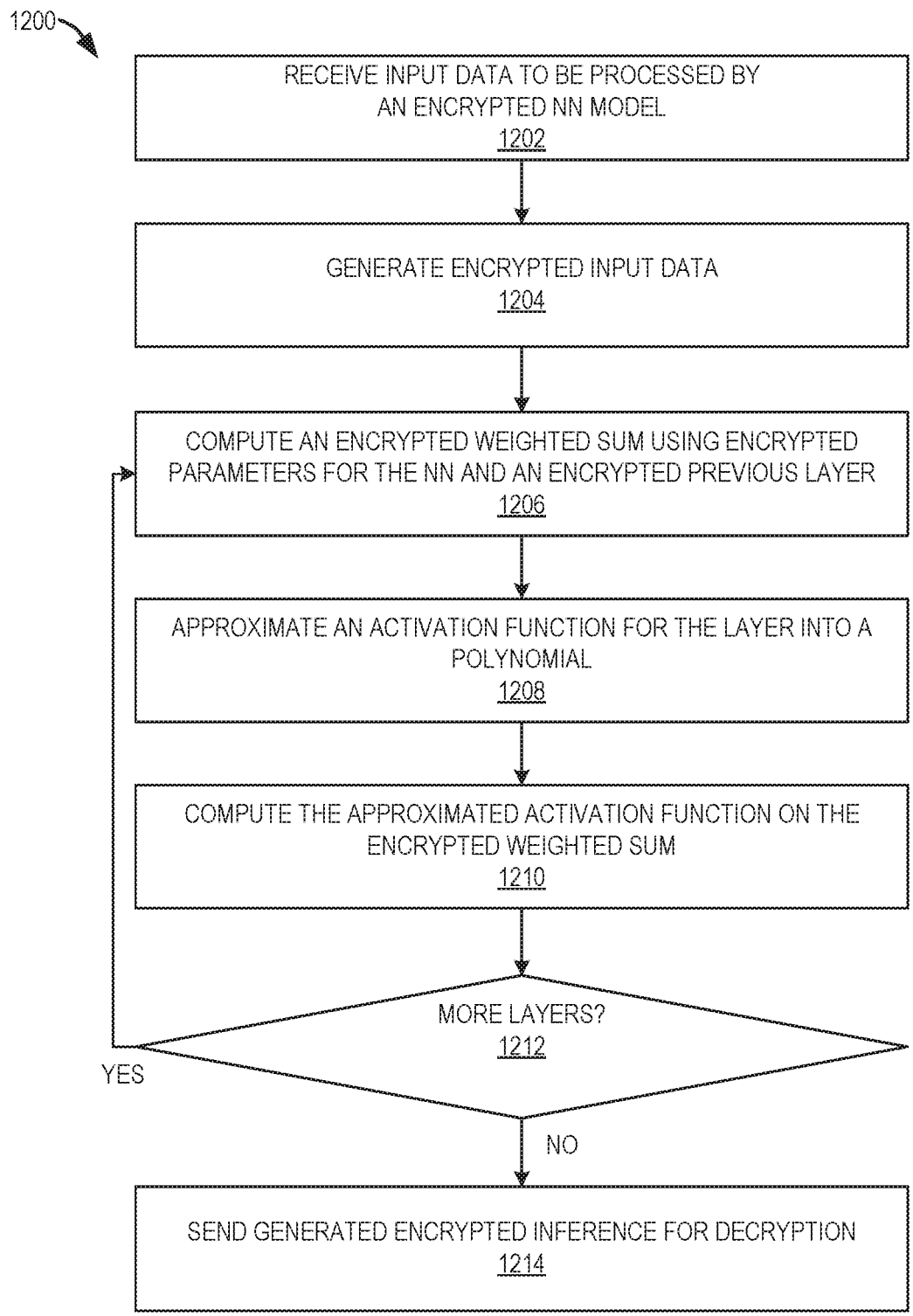
FIG. 12 is flowchart illustrating aspects of a method, according to some example embodiments.
Figure 13:
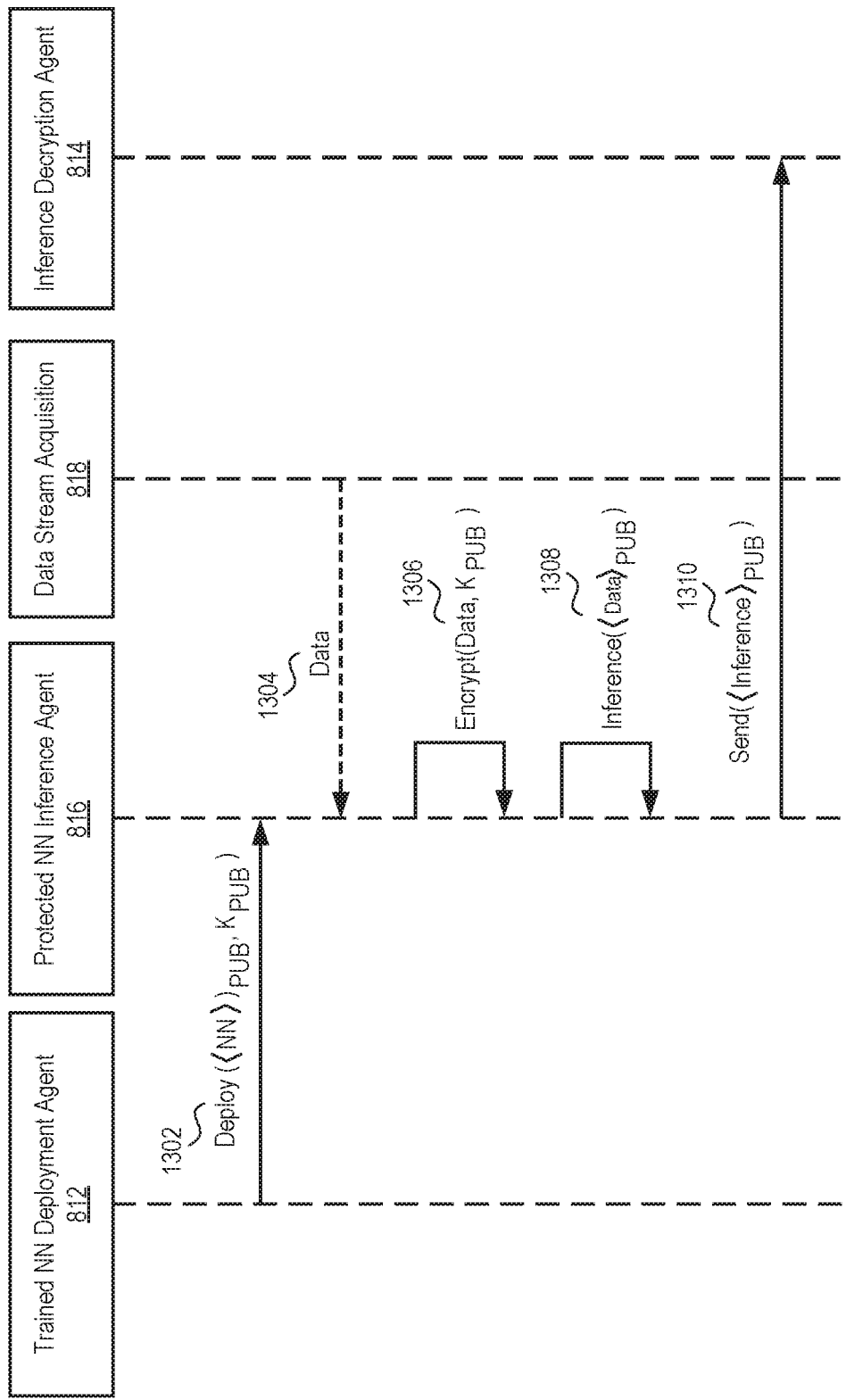
FIG. 13 is an example sequence diagram illustrating inference processing, according to some example embodiments.

FIG. 12 is a flow chart illustrating aspects of a method 1200 for generating encrypted input data and an encrypted inference, according to some example embodiments. For illustrative purposes, method 1200 is described with respect to the networked system 100 of FIG. 1 and example sequence diagram in FIG. 12 illustrating inference processing. It is to be understood that method 1200 may be practiced with other system configurations in other embodiments.

In operation 1202, a computing system (e.g., remote system 202) accesses or receives input data to be processed by an encrypted NN model. As explained above, and shown in FIG. 13, a trained NN deployment agent 812 deploys an encrypted NN model at 1302, and the remote system 202 receives the encrypted NN model by a protected NN inference agent 816. The computing system also receives the public key for the model. In one example, the remote system 202 stores the received encrypted NN model and the public key.

The computing system can then use the encrypted NN model to process data (also referred to herein as "input data). For example, the protected NN inference agent 816 accesses or receives data 1304 collected by the data stream acquisition component 818 and encrypts the data using the public encryption key at 1306, to generate encrypted input data in operation 1204. In one example, the computing system encrypts the input data using a fully homomorphic (FHE) public key associated with the encrypted NN model to generated encrypted input data. For example, the input data is vectorized, and the first layer of the NN comprises the vectorized input data. The vectorized input data is then encrypted homomorphically, using the public key associated with the encrypted NN model to generate the encrypted input data as the first layer of the NN encrypted homomorphically.

Accordingly, after the data is collected and encrypted, the computing system injects the data into the deployed encrypted NN model. The computing system then encrypts $A^{[0]}=X$ with the public encryption key associated with the deployed encrypted NN model. For example, as the first layer (e.g., encrypted vectorized input data) and NN parameters are encrypted, fully homomorphic encryption is propagated across NN layers to the output layer.

After the input data is encrypted, the input data is processed to generate an encrypted inference output (as shown in 1308), using the encrypted NN model, by applying the following process at each layer (e.g., hidden and output layer) to generate an encrypted layer: (1) a weighted sum is computed with encrypted parameters and a previous encrypted layer, and (2) an activation function (approximated into a polynomial) is computed on the encrypted weighted sum. For example, in operation 1206, the computing system computes an encrypted weighted sum using encrypted parameters and an encrypted previous layer. As explained above, encrypted parameters may include encrypted weights and biases, encrypted BN, and/or other parameters. For the first pass, the encrypted previous layer is the encrypted input data. After the first pass, the encrypted previous layer is the encrypted layer before the layer being processed.

In operation 1208, the computing system approximates an activation function for the layer into a polynomial. As explained above, the activation function needs to be approximated into a polynomial in order to compute on homomorphically encrypted parameters. In operation 1210, the computing system computes the approximated activation function on the encrypted weighted sum to result in (generate) an encrypted layer for the layer being processed.

In operation 1212, the computing system determines whether there are any more layers to process. If there are more layers, the computing device returns to operation 1206. If there are no more layers to process, the computing device moves on to operation 1214.

In operation 1214, the computing system sends the generated encrypted inference to a server system for decryption, as explained above, and as also shown in 1310 of FIG. 13.

Accordingly, example embodiments provide a solution for the protection of IP for neural networks, such as decentralized Deep Neural Networks. For example, by leveraging Fully Homomorphic Encryption, the trained NN is encrypted and the input data and resulting inferences are also encrypted. Example embodiments include a modification of DNN to use linear approximation of activations functions, together with the decomposition of all operations into sums and multiplications, and encryption of input data at the inference phase.

Figure 14:
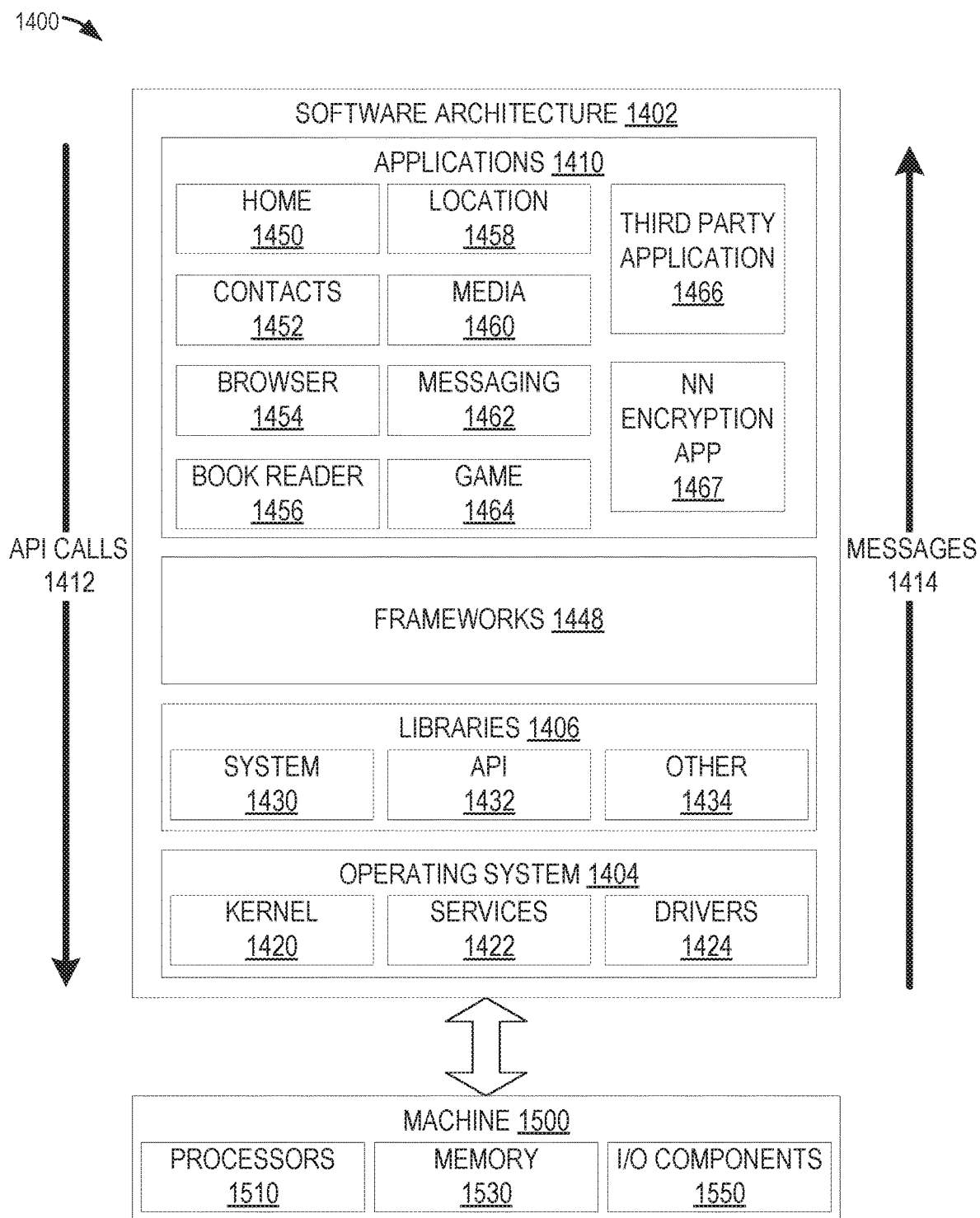
FIG. 14 is a block diagram illustrating an example of a software architecture that may be installed on a machine, according to some example embodiments.

FIG. 14 is a block diagram 1400 illustrating software architecture 1402, which can be installed on any one or more of the devices described above. For example, in various embodiments, client devices 110 and servers and systems 130, 102, 120, 122, and 124 may be implemented using some or all of the elements of software architecture 1402. FIG. 14 is merely a non-limiting example of a software architecture, and it will be appreciated that many other architectures can be implemented to facilitate the functionality described herein. In various embodiments, the software architecture 1402 is implemented by hardware such as machine 1500 of FIG. 15 that includes processors 1510, memory 1530, and I/O components 1550. In this example, the software architecture 1402 can be conceptualized as a stack of layers where each layer may provide a particular functionality. For example, the software architecture 1402 includes layers such as an operating system 1404, libraries 1406, frameworks 1448, and applications 1410. Operationally, the applications 1410 invoke application programming interface (API) calls 1412 through the software stack and receive messages 1414 in response to the API calls 1412, consistent with some embodiments.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers, consistent with some embodiments. For example, the kernel 1420 provides memory management, processor management (e.g., scheduling), component management, networking, and security settings, among other functionality. The services 1422 can provide other common services for the other software layers. The drivers 1424 are responsible for controlling or interfacing with the underlying hardware, according to some embodiments. For instance, the drivers 1424 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1406 provide a low-level common infrastructure utilized by the applications 1410. The libraries 1406 can include system libraries 1430 (e.g., C standard library) that can provide functions such as memory allocation functions, string manipulation functions, mathematic functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1406 can also include a wide variety of other libraries 1434 to provide many other APIs to the applications 1410.

The frameworks 1448 provide a high-level common infrastructure that can be utilized by the applications 1410, according to some embodiments. For example, the frameworks 1448 provide various graphic user interface (GUI) functions, high-level resource management, high-level location services, and so forth. The frameworks 1448 can provide a broad spectrum of other APIs that can be utilized by the applications 1410, some of which may be specific to a particular operating system 1404 or platform.

In an example embodiment, the applications 1410 include a home application 1450, a contacts application 1452, a browser application 1454, a book reader application 1456, a location application 1458, a media application 1460, a messaging application 1462, a game application 1464, and a broad assortment of other applications such as a third-party application 1466. According to some embodiments, the applications 1410 are programs that execute functions defined in the programs. Various programming languages can be employed to create one or more of the applications 1410, structured in a variety of manners, such as object-oriented programming languages (e.g., Objective-C, Java, or C++) or procedural programming languages (e.g., C or assembly language). In a specific example, the third-party application 1466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1466 can invoke the API calls 1412 provided by the operating system 1404 to facilitate functionality described herein.

Some embodiments may particularly include a NN encryption application 1467. In certain embodiments, this may be a stand-alone application that operates to manage communications with a server system such as remote systems 130 or server system 102. In other embodiments, this functionality may be integrated with another application. The NN encryption application 1467 may request and display various data related to neural networks and may provide the capability for a user 106 to input data related to the objects via a touch interface, keyboard, or using a camera device of machine 1500, communication with a server system via I/O components 1550, and receipt and storage of object data in memory 1530. Presentation of information and user inputs associated with the information may be managed by NN encryption application 1467 using different frameworks 1448, library 1406 elements, or operating system 1404 elements operating on a machine 1500.

Figure 15:
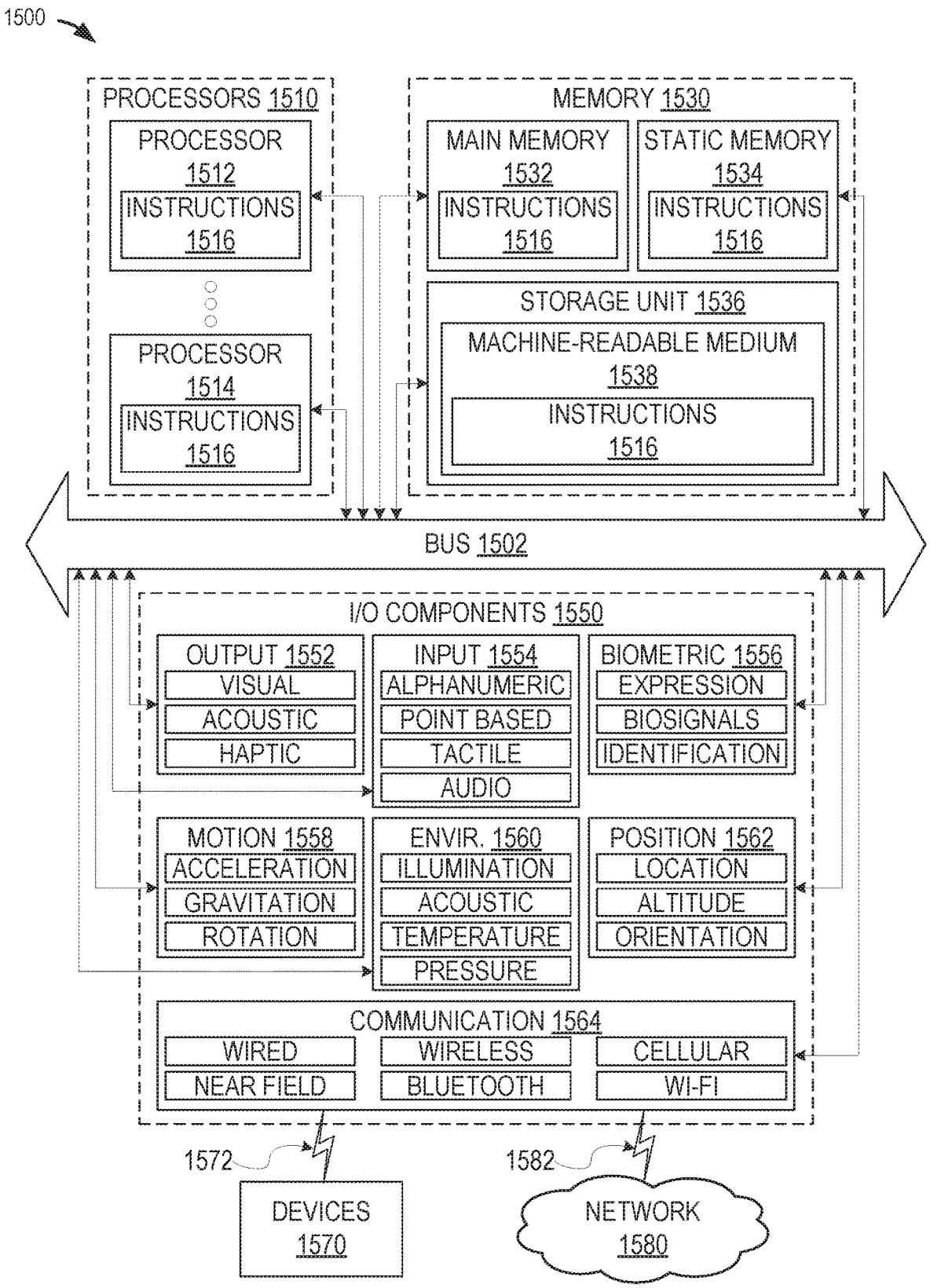
FIG. 15 illustrates a diagrammatic representation of a machine, in the form of a computer system, within which a set of instructions may be executed for causing the machine to perform any one or more of the methodologies discussed herein, according to an example embodiment.

FIG. 15 is a block diagram illustrating components of a machine 1500, according to some embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application 1410, an apples, an app, or other executable code) for causing the machine 1500 to perform any one or more of the methodologies discussed herein can be executed. In alternative embodiments, the machine 1500 operates as a standalone device or can be coupled (e.g., networked) to other machines. In a networked deployment, the machine 1500 may operate in the capacity of a server machine 130, 102, 120, 122, 124, etc., or a client device 110 in a server-client network environment, or as a peer machine in a peer-to-peer (or distributed) network environment. The machine 1500 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

In various embodiments, the machine 1500 comprises processors 1510, memory 1530, and I/O components 1550, which can be configured to communicate with each other via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1512 and a processor 1514 that may execute the instructions 1516. The term "processor" is intended to include multi-core processors 1510 that may comprise two or more independent processors 1512, 1514 (also referred to as "cores") that can execute instructions 1516 contemporaneously. Although FIG. 15 shows multiple processors 1510, the machine 1500 may include a single processor 1510 with a single core, a single processor 1510 with multiple cores (e.g., a multi-core processor 1510), multiple processors 1512, 1514 with a single core, multiple processors 1512, 1514 with multiples cores, or any combination thereof.

The memory 1530 comprises a main memory 1532, a static memory 1534, and a storage unit 1536 accessible to the processors 1510 via the bus 1502, according to some embodiments. The storage unit 1536 can include a machine-readable medium 1538 on which are stored the instructions 1516 embodying any one or more of the methodologies or functions described herein. The instructions 1516 can also reside, completely or at least partially, within the main memory 1532, within the static memory 1534, within at least one of the processors 1510 (e.g., within the processor's cache memory), or any suitable combination thereof, during execution thereof by the machine 1500. Accordingly, in various embodiments, the main memory 1532, the static memory 1534, and the processors 1510 are considered machine-readable media 1538.

As used herein, the term "memory" refers to a machine-readable medium 1538 able to store data temporarily or permanently and may be taken to include, but not be limited to, random-access memory (RAM), read-only memory (ROM), buffer memory, flash memory, and cache memory. While the machine-readable medium 1538 is shown, in an example embodiment, to be a single medium, the term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions 1516, when executed by one or more processors of the machine 1500 (e.g., processors 1510), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1550 include a wide variety of components to receive input, provide output, produce output, transmit information, exchange information, capture measurements, and so on. In general, it will be appreciated that the I/O components 1550 can include many other components that are not shown in FIG. 15. The I/O components 1550 are grouped according to functionality merely for simplifying the following discussion, and the grouping is in no way limiting. In various example embodiments, the I/O components 1550 include output components 1552 and input components 1554. The output components 1552 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1554 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1550 include biometric components 1556, motion components 1558, environmental components 1560, or position components 1562, among a wide array of other components. For example, the biometric components 1556 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 include acceleration sensor components (e.g., accelerometer), gravitation sensor components, rotation sensor components (e.g., gyroscope), and so forth. The environmental components 1560 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1562 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 include a network interface component or another suitable device to interface with the network 1580. In further examples, communication components 1564 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1570 may be another machine 1500 or any of a wide variety of peripheral devices (e.g., a peripheral device coupled via a Universal Serial Bus (USB)).

Moreover, in some embodiments, the communication components 1564 detect identifiers or include components operable to detect identifiers. For example, the communication components 1564 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1564, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 can implement any of a variety of types of data transfer technology, such as Single Carrier Radio Transmission Technology (1×RTT), Evolution-Data Optimized (EVDO) technology, General Packet Radio Service (GPRS) technology, Enhanced. Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1516 are transmitted or received over the network 1580 using a transmission medium via a network interface device (e.g., a network interface component included in the communication components 1564) and utilizing any one of a number of well-known transfer protocols (e.g., Hypertext Transfer Protocol (HTTP)). Similarly, in other example embodiments, the instructions 1516 are transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Furthermore, the machine-readable medium 1538 is non-transitory (in other words, not having any transitory signals) in that it does not embody a propagating signal. However, labeling the machine-readable medium 1538 "non-transitory" should not be construed to mean that the medium is incapable of movement; the medium 1538 should be considered as being transportable from one physical location to another. Additionally, since the machine-readable medium 1538 is tangible, the medium 1538 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
accessing, by a computing system including at least one hardware processor, input data to be processed by an encrypted neural network (NN) model executing on the computing system, wherein a fully homomorphic (FHE) public key was used to encrypt parameters comprised in the encrypted NN model;

encrypting, by the computing system, the input data using the same FHE public key used to encrypt parameters comprised in the encrypted NN model, to generate encrypted input data;

processing, using the encrypted NN model, the encrypted input data to generate an encrypted inference output, by performing the following operations for each layer of a plurality of layers of the encrypted NN model:

computing an encrypted weighted sum using the encrypted parameters of the encrypted NN model and a previous encrypted layer of the encrypted NN model, the encrypted parameters comprising at least an encrypted weight and an encrypted bias;

approximating an activation function for the layer of the encrypted NN model into a polynomial; and computing the approximated activation function on the encrypted weighted sum to generate an encrypted layer; and sending the generated encrypted inference output with an identifier associated with the encrypted NN model to a server system for decryption, wherein the identifier is used to determine a private key associated with the encrypted NN model corresponding to the identifier and decrypt the encrypted inference output using the private key.

2. The computer-implemented method of claim 1, wherein before accessing the input data the method comprises:
receiving the encrypted NN model; and
storing the received encrypted NN model.

3. The computer-implemented method of claim 2, wherein receiving the encrypted NN model includes receiving the FHE public key.

4. The computer-implemented method of claim 1, wherein the encrypted NN model is generated by:
accessing the parameters for a trained neural network, the parameters including at least a matrix of weights and a matrix of biases;
encrypting the parameters of the trained NN using the FHE public key, including encrypting each weight in the matrix of weights and each bias in the matrix of biases to generate the encrypted NN model from the trained neural network.

5. The method of claim 4, wherein the encrypted NN model is generated on the server system separate from the computing system and deployed from the server system to the computing system.

6. The computer-implemented method of claim 1, wherein the plurality of layers comprise at least one of a fully connected layer, a convolutional layer, and a pooling layer.

7. The computer-implemented method of claim 1, wherein the plurality of layers comprise hidden layers and an output layer.

8. A system comprising:
a memory that stores instructions; and
one or more processors configured by the instructions to perform operations comprising:
accessing input data to be processed by an encrypted neural network (NN) model executing on the computing system, wherein a fully homomorphic (FHE) public key was used to encrypt parameters comprised in the encrypted NN model;
encrypting the input data using the same FHE public key used to encrypt parameters comprised in the encrypted NN model, to generate encrypted input data;

processing, using the encrypted NN model, the encrypted input data to generate an encrypted inference output, by performing the following operations for each layer of a plurality of layers of the encrypted NN model:

computing an encrypted weighted sum using the encrypted parameters of the encrypted NN model and a previous encrypted layer of the encrypted NN model, the encrypted parameters comprising at least an encrypted weight and an encrypted bias;

approximating an activation function for the layer of the encrypted NN model into a polynomial; and computing the approximated activation function on the encrypted weighted sum to generate an encrypted layer; and sending the generated encrypted inference output with an identifier associated with the encrypted NN model to a server system for decryption, wherein the identifier is used to determine a private key associated with the encrypted NN model corresponding to the identifier and decrypt the encrypted inference output using the private key.

9. The system of claim 8, wherein before accessing the input data the operations comprise:
receiving the encrypted NN model; and
storing the received encrypted NN model.

10. The system of claim 9, wherein receiving the encrypted NN model includes receiving the FHE public key.

11. The system of claim 8, wherein the encrypted NN model is generated by:
accessing the parameters for a trained neural network, the parameters including at least a matrix of weights and a matrix of biases;
encrypting the parameters of the trained NN using the FHE public key, including encrypting each weight in the matrix of weights and each bias in the matrix of biases to generate the encrypted NN model from the trained neural network.

12. The system of claim 11, wherein the encrypted NN model is generated on the server system separate from the system and deployed from the server system to the system.

13. The system of claim 8, wherein the plurality of layers comprise hidden layers and an output layer.

14. A system comprising:
a memory that stores instructions; and
one or more processors configured by the instructions to perform operations comprising:
accessing parameters for a trained neural network (NN), the parameters comprising at least a matrix of weights and a matrix of biases;
generating fully homomorphic encryption (FHE) key pair comprising an FHE public key and private key;
encrypting, using the FHE public key, each weight in the matrix of weights and each bias in the matrix of biases to generate an encrypted NN model comprising the encrypted weights and biases;
deploying the encrypted NN model to a remote system with the FHE public key, wherein input data is encrypted using the same FHE public key associated with the encrypted NN model to generate encrypted input data and the encrypted input data is processed to generate an encrypted inference output, using the encrypted NN model, by performing the following operations for each level of a plurality of levels of the encrypted NN model:
computing an encrypted weighted sum using the encrypted parameters of the encrypted NN model and a previous encrypted layer of the encrypted NN model, the encrypted parameters comprising at least an encrypted weight and an encrypted bias;

approximating an activation function for the layer of the encrypted NN model into a polynomial; and computing the approximated activation function on the encrypted weighted sum to generate an encrypted layer;

receiving, from the remote system, the encrypted inference output with an identifier associated with the encrypted NN model;

determining a private key associated with the encrypted NN model using the identifier; and decrypting the encrypted inference output using the private key associated with the encrypted NN model.

15. The system of claim 14, the operations further comprising:

storing the encrypted NN model together with the FHE key pair in one or more databases.

16. The system of claim 14, wherein the trained NN network is a deep convolutional neural network.

* * * * *